(12) United States Patent
Kumar

(10) Patent No.: US 10,346,813 B2
(45) Date of Patent: Jul. 9, 2019

(54) INTELLIGENT CHECK DEPOSIT MACHINE

(71) Applicant: NEWGEN SOFTWARE INC., McLean, VA (US)

(72) Inventor: Mayank Kumar, Chennai (IN)

(73) Assignee: NEWGEN SOFTWARE INC., McLean, VA (US)

( * ) Notice: Subject to any disclaimer, the term of this patent is extended or adjusted under 35 U.S.C. 154(b) by 691 days.

(21) Appl. No.: 14/752,164

(22) Filed: Jun. 26, 2015

(65) Prior Publication Data

US 2016/0005008 A1    Jan. 7, 2016

Related U.S. Application Data

(60) Provisional application No. 61/998,543, filed on Jul. 1, 2014.

(51) Int. Cl.
*G06Q 20/04* (2012.01)
*G06Q 20/10* (2012.01)
*G06Q 20/40* (2012.01)
*G06Q 20/18* (2012.01)
*H04N 1/00* (2006.01)

(52) U.S. Cl.
CPC ......... *G06Q 20/042* (2013.01); *G06Q 20/108* (2013.01); *G06Q 20/18* (2013.01); *G06Q 20/40* (2013.01); *H04N 1/00* (2013.01); *G06T 2207/10* (2013.01)

(58) Field of Classification Search
None
See application file for complete search history.

(56) References Cited

U.S. PATENT DOCUMENTS

| 8,422,758  | B1* | 4/2013  | Bueche, Jr. | G06Q 20/042 |
|            |     |         |             | 382/137     |
| 8,688,579  | B1* | 4/2014  | Ethington   | G06Q 40/02  |
|            |     |         |             | 705/35      |
| 9,779,452  | B1* | 10/2017 | Medina      | G06Q 20/0425 |
| 2005/0065893 | A1* | 3/2005 | Josephson   | G06Q 20/14  |
|            |     |         |             | 705/64      |
| 2009/0214085 | A1* | 8/2009 | Bickell     | G06K 9/03   |
|            |     |         |             | 382/112     |
| 2012/0123938 | A1* | 5/2012 | Viera       | G06Q 20/108 |
|            |     |         |             | 705/42      |
| 2012/0132620 | A1* | 5/2012 | Guidotti    | G06Q 20/042 |
|            |     |         |             | 216/85      |

* cited by examiner

*Primary Examiner* — Joseph W. King
(74) *Attorney, Agent, or Firm* — Gipple & Hale; John S. Hale

(57) ABSTRACT

A method for validating the physical parameters of a check to approve or deny the deposit transaction comprising the steps of scanning a physical check with a scanner, comparing the digital scan of the check against preset digital parameters by a field comparator to insure that the digital scan of the check meets predetermined physical check parameters and check fields and preparing a written rejection/acceptance to the check submitted in the form of a deposit receipt.

1 Claim, 4 Drawing Sheets

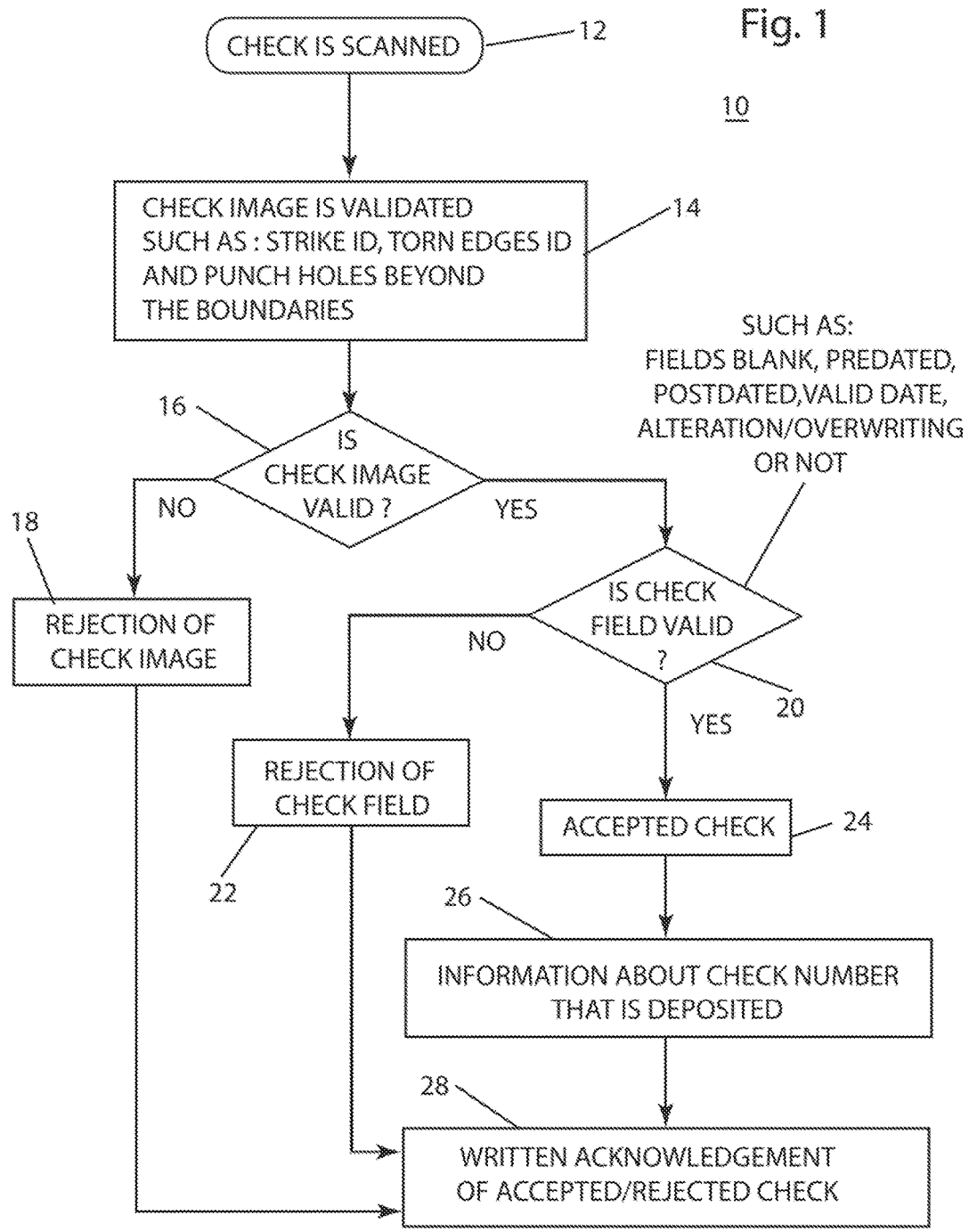

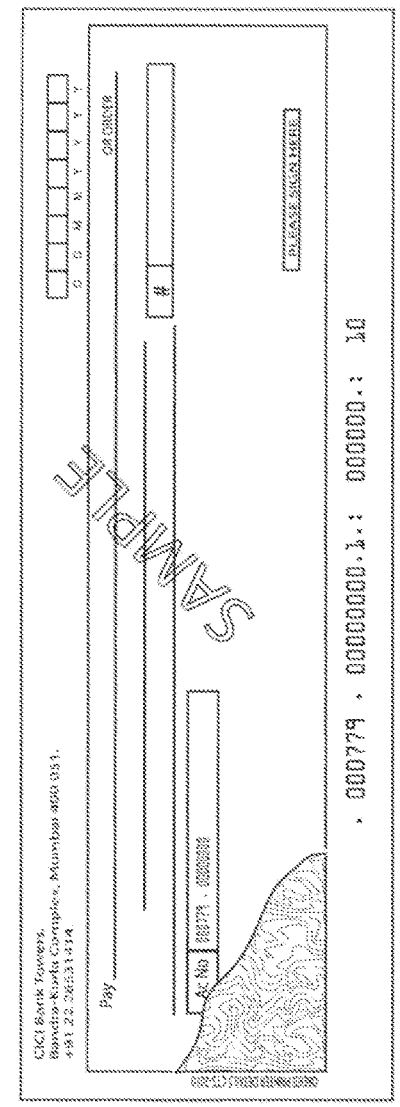

INTELLIGENT CHECK DEPOSIT MACHINE

RELATED APPLICATIONS

This is a utility application claiming benefit and priority from U.S. Provisional Application No. 61/998,543, filed Jul. 1, 2014.

STATEMENT REGARDING FEDERALLY SPONSORED RESEARCH OR DEVELOPMENT

Not applicable.

REFERENCE TO SEQUENCE LISTING, A TABLE OR A COMPUTER PROGRAM LISTING COMPACT DISC APPENDIX

None.

BACKGROUND OF THE INVENTION

1. Field of Invention

Banking systems and processes have always been in the process of evolution for the betterment and convenience of the customers. A problem which currently exists is that there is no deck data or physical check validation causing checks that are damaged or improperly filled out or having data omitted to be returned to the user. The present invention solves this problem.

2. Description of the Prior Art

Check deposit machines have gained immense importance in recent years as they offer a blend of convenience of check deposit along with the immediate generation of a deposit receipt to the customer. Also, with the check truncation systems in place, the checks can be immediately introduced in the workflow for clearing which can further speed up the check clearing process. However, current systems are limited to generating a receipt for deposited checks.

Use of check truncation systems saves the user from the traditional method of depositing the check in the bank or dropping the check in the drop-box at the ATM.

In the past, the most common problem that existed was of lost or misplaced checks. Also, going to the bank to deposit a check was a tedious and time taking task as the customer had to stand in lines at the branch counters or wait in their automobile for drive thru banking. In addition the overhead for the banks was increased as extra man-power was required for handling the deposit of checks and providing receipts.

The presently used check deposit machines have eliminated this problem. The main problem with the current check deposit machines is that they are only depositing the check and there is no data or check validation that has been implemented in these machines. The validation is done only when the check actually reaches the bank clearing workflow. The check deposit machine process involves (1) entering the account number, (2) depositing the check, (3) entering the amount and (4) giving an acknowledgement to the depositor. The acknowledgement contains fields such as date, time, account number in which check has to be deposited, and check number. This system however does not verify the quality of the check, validate the check fields and does not indicate to the user that his or her check is valid and will be deposited.

The deposited checks are then collected from the bank deposit centers and they follow their normal route of clearing. The checks that are deposited in the banks on a daily basis for clearing is huge and involves a cycle of stages. The check is dropped in the drop box at the ATM or deposited in the check deposit machine. The check is then collected from the center and sent to the clearing house from where they are sent to the drawee bank service branch. The drawee bank then re-sends the same to the clearing house and the clearing house sends it to the settlement bank. If there is no problem with the data filled in the check, the amount gets credited to the customer's account. If at any of the stages, the check is found to have some discrepancy in data or is physically damaged, the check is returned unpaid to the depositor.

The complete check clearing cycle normally takes 2-5 working days and the customer has to wait for the money to be credited to his account. If the data filled in the check is incorrect or missing, or if the checks are of poor quality, it is only after a wait of 2-5 days that the depositor is informed that the check has been rejected by the bank. This time-period still has not been reduced after the introduction of the check deposit machines. Currently check deposit machines are used to scan the check and gives acknowledgement for the check deposit process. A huge amount of checks are deposited in machines and these checks are sent to the bank for check quality analysis and validation. Significant effort is required in check quality analysis and validation. This effort can be removed or greatly reduced if validation can be done while depositing the check in check deposit machines.

These and many other problems are addressed by the instant invention.

SUMMARY OF THE INVENTION

The present invention is directed toward a solution for automatic check document validity to distinguish between valid and invalid, checks by checking validation of checks. A validator component inside the check deposit machine is used to analyze the scanned image and conclude whether the check is valid or not. The physical validity of the check is checked by examining features like torn edges/corners, punch holes beyond the check boundary. Data is validated for items such as missing data, post-dated, predated, strike identification on checks, invalid date on checks, alteration or overwriting. The system also gives acknowledgement for the check deposit process including details like check number, date, name, and provides a receipt for a rejection along with a valid reason It is an object of the invention to check of the physical validity of a check being deposited.

It is another object of the invention to check for data validation of a check being deposited.

It is yet another object of the invention to provide a receipt for any check rejection stating the reason.

These and other objects, advantages, and novel features of the present invention will become apparent when considered with the teachings contained in the detailed disclosure along with the accompanying drawings.

BRIEF DESCRIPTION OF THE DRAWINGS

The present invention will be described with reference to the appended Figures, in which:

FIG. 1 is a schematic representation of the invention check validation process.

FIG. 2 is a perspective view of a check scanner and deposit slip generating machine.

FIG. 3 is a representation of a check with physical damage.

DETAILED DESCRIPTION OF THE INVENTION

Figure 4:
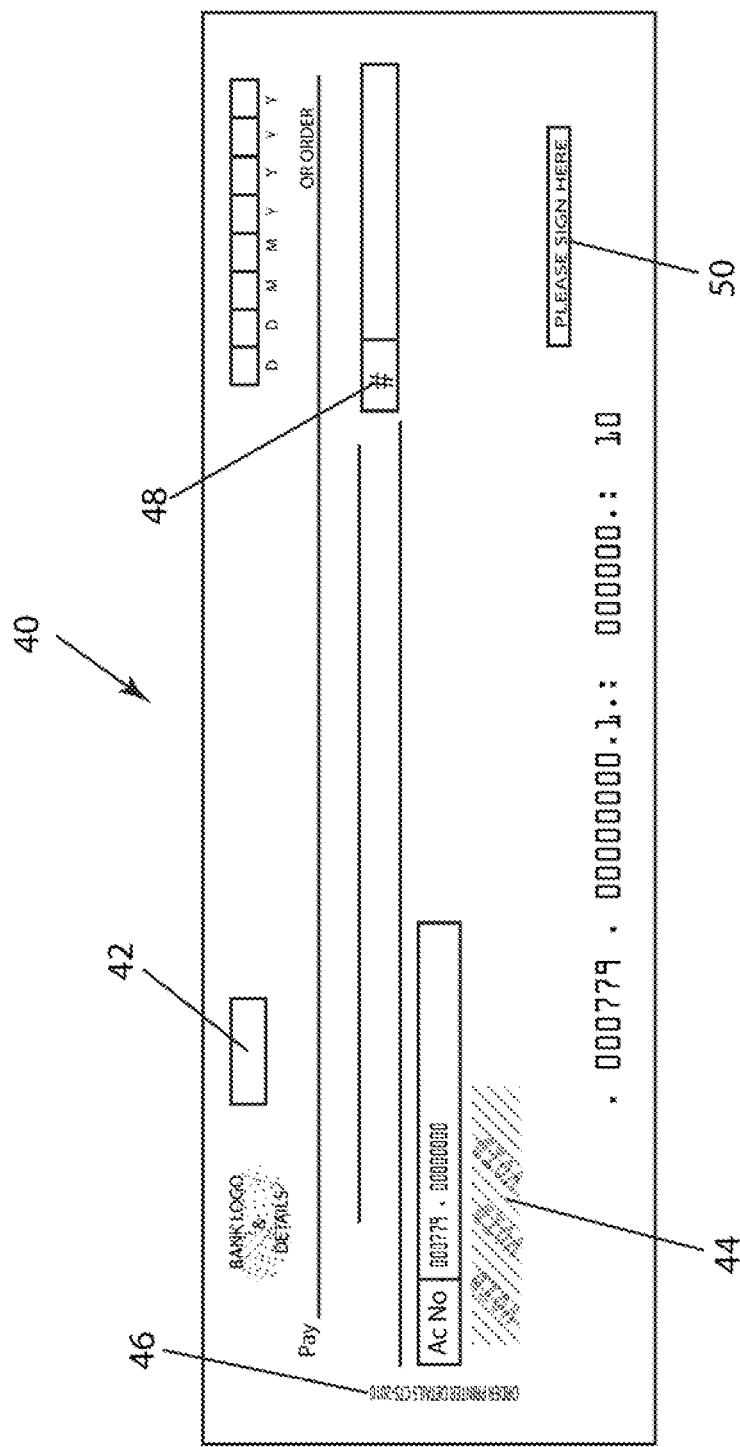
FIG. 4 is a representation of a check showing necessary data points which will be checked.

The best mode and preferred embodiment of the invention is shown in FIGS. 1-5. The present invention is directed towards a check verification process invention.

The check verification process 10 as shown in FIG. 1 addresses those problems previously noted by providing a process wherein check validation and quality analysis would be done at the time of depositing the check. In case there is any problem with damage to the physical check or with the data contained on the check, the process would raise a flag and the check deposit machine would not accept the check and then return it to the depositor with a reason for the refusal to accept.

The intelligent check deposit system scans the check, validates check fields and gives acknowledgement to the check depositors for their respective action. The process tells whether the check is acceptable or not at the time of dropping the check in the check deposit machine.

The System scans the check 30 using a check scanner apparatus 11 which receives the check in slot 112 and checks the scanned check image to inspect the physical parameters like torn edges, punch holes beyond the check boundary, and strike identification on the check. If system finds that check image validity is fine, it goes to next step to validate check fields such as blank field, invalid date, post or pre date, overwriting, and alteration. After validation, the system prepares and gives a deposit receipt from slot 114 for the corresponding user action with proper description. The deposit receipt 60 has a receipt number 62, a scanned copy of the check 140, an accepted/rejected blank 64 with the reason for rejection if not accepted placed in the space 66 with a date/time area 68.

User instructions are shown on the apparatus monitor screen 110.

The following are the sequence of steps followed by the process for the check analysis:

As shown in FIG. 1, a check is scanned 12. The image validity of the scanned check in the check scanner 11 is checked by the check image validity step 14 of the scanned check to identify the following features:

a. Strike identification—If anything is marked out in the check,
 b. Torn edges identification—check the integrity of the check, and
 c. Punch holes beyond the check boundary.

A check image validation 16 for image validity, a.-c. noted above is undertaken on the check image and if it does not meet the validation criteria, it is passed to rejection 18. If the check meets the image validation criteria, it is passed to a validity field comparator 20. The validity field comparator 20 undertakes a determination of the following:

a. Determining whether any fields on the check are blank or not;
 b. Determining whether check is predated or not;
 c. Determining whether check is postdated or not;
 d. Determining date validation such as whether date is valid or not; and
 e. Determining any alteration/overwriting on check field.

If the check does not pass the validity field criteria as noted in a.-e. above, it is rejected as shown in FIG. 1 by block 22 and handled by acknowledgement step 28. If the check passes the valid check field criteria as noted at block 20, the check is accepted as shown by block 24. After image validity analysis, the system accepts the check and queries the account number 26 in which check is to be deposited and generates a written acknowledgement 28 for the acceptation/rejection of the check with a valid reason for same.

Figure 5:
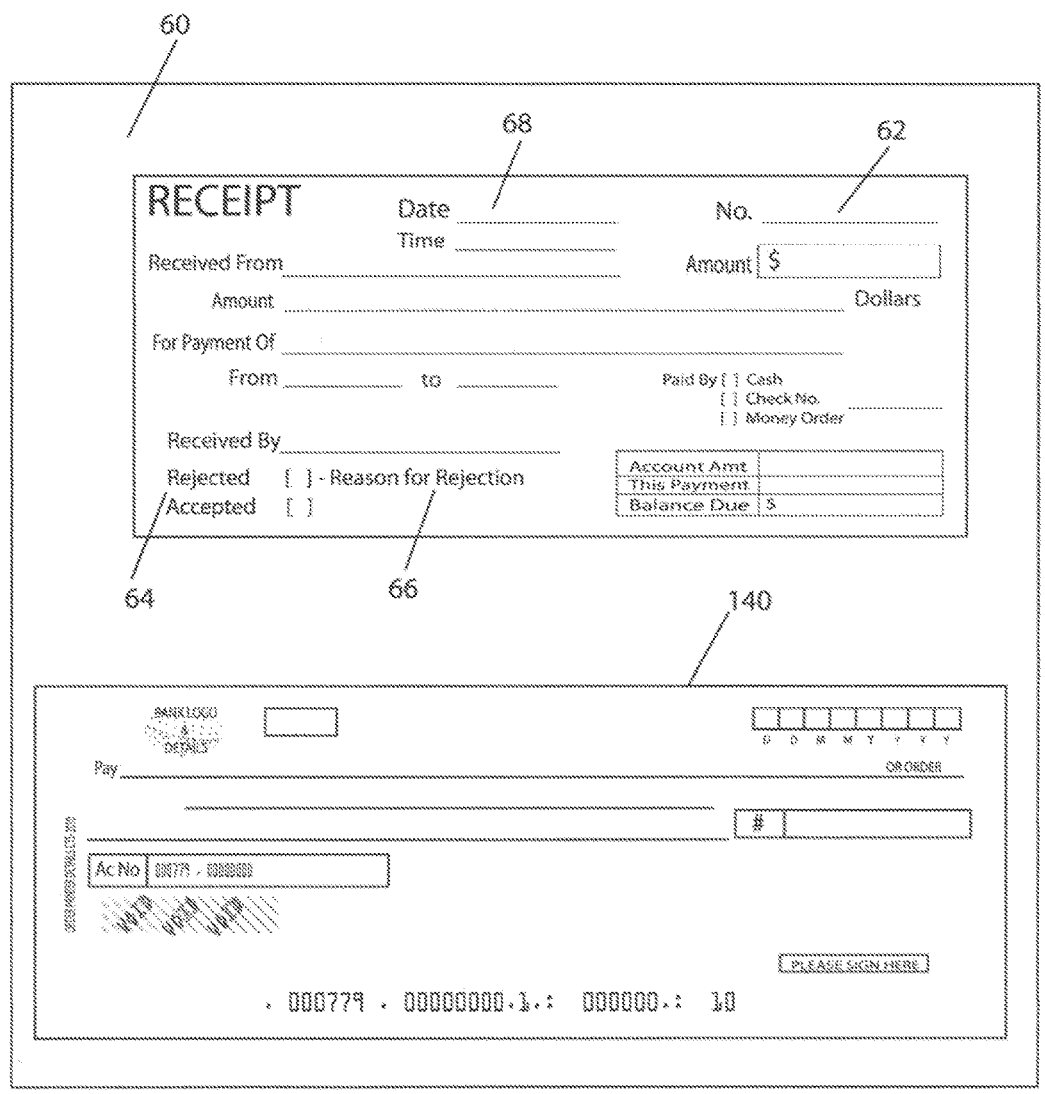
FIG. 5 is a receipt showing the scanned image of the check and receipt with data fields.

The system gives a deposit receipt 60, as shown in FIG. 5, through slot 114 as shown in FIG. 2 as acknowledgment to the validity or invalidity of the check for deposit.

When a new check format 40 is used as shown in FIG. 4, the check is bathed in ultra violet light so that the bank logo 42 primed in invisible ink is illuminated. The void field 44 is viewed and the check printer details and CTS-2010 information 46 are received. The check number symbol 48 is viewed and the signature space 50 is viewed. The number symbol 48 refers to any currency sign description such as a Dollar sign, Pound sign, Euro sign, Rupee sign or any currency sign designation.

The inventive intelligent check deposit machine adds benefit to the existing check deposit machine by adding more functionality like check scanned image quality analysis and check field validations thereby enhancing the overall performance of the check clearing process.

It also saves time and manual labor involved in accepting/rejecting a check and enables the handling of more bulk images thus increasing the efficiency of the banks. It also provides enhanced customer experience as transaction time that could have been wasted is now saved.

The principles, preferred embodiments and modes of operation of the present invention have been described in the foregoing specification. However, the invention should not be construed as limited to the particular embodiments that have been described above. Instead, the embodiments described here should be regarded as illustrative rather than restrictive. Variations and changes may be made by others without departing from the scope of the present invention as defined by the following claims:

What I claim is:

1. A method for validating a check before approval or rejection of a deposit transaction for the check comprising the steps of:

scanning a deposited physical check with a check scanner apparatus to obtain a digital scan image of the check;
 comparing the digital scan image of said check with said check scanner apparatus to validate physical parameters of said digital scan image of the check, including checking for strike identification, torn edge identification and punch hole identification beyond the boundary of said check to insure that the digital scan of the check meets said physical digital check;
 further validating said digital scan image of said check with said check scanner apparatus and determining whether any data field on said digital scan image of said check is blank, whether any data field on the digital check image is a date that is predated with respect to a date the physical check is deposited, whether any data field on the digital check image is a date that is postdated with respect to said date the physical check is deposited, and determining whether any data field on the digital check image has any alteration/overwriting; and
 subsequent to said comparing and said further validaling, rejecting the deposit transaction and generating a written check rejection receipt with the check scanner apparatus based on said comparing and said further validating, where the written check rejection receipt includes a specific reason for the rejection of the check and the deposit transaction, and includes an image of a front side of the deposited physical check.

\* \* \* \* \*